United States Patent
Hua et al.

(10) Patent No.: US 12,091,068 B2
(45) Date of Patent: Sep. 17, 2024

(54) SYSTEM AND METHOD FOR OPERATING A SYSTEM HAVING A RAIL, A STATIONARY UNIT, RAIL-GUIDED MOBILE PARTS, AND A SLOTTED HOLLOW WAVEGUIDE

(71) Applicant: SEW-EURODRIVE GMBH & CO. KG, Bruchsal (DE)

(72) Inventors: Zhidong Hua, Bruchsal (DE); Jonas Felix Bürgel, Karlsruhe (DE); Michael Lindenfelser, Bruchsal (DE); Andreas Wanjek, Waghäusel (DE); Thomas Schäfer, Karlsdorf-Neuthard (DE); Josef Schmidt, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 784 days.

(21) Appl. No.: 17/291,840

(22) PCT Filed: Oct. 15, 2019

(86) PCT No.: PCT/EP2019/025346
§ 371 (c)(1),
(2) Date: May 6, 2021

(87) PCT Pub. No.: WO2020/094250
PCT Pub. Date: May 14, 2020

(65) Prior Publication Data
US 2021/0394806 A1    Dec. 23, 2021

(30) Foreign Application Priority Data
Nov. 7, 2018    (DE) .................. 102018008732.9

(51) Int. Cl.
*B61L 23/34*    (2006.01)
*B61L 15/00*    (2006.01)
(Continued)

(52) U.S. Cl.
CPC ........... *B61L 23/34* (2013.01); *B61L 15/0027* (2013.01); *B61L 15/0036* (2013.01);
(Continued)

(58) Field of Classification Search
CPC ...... B61L 23/34; B61L 25/021; B61L 25/025; B61L 15/0027; B61L 15/0036; B61L 25/026; G01S 11/16
See application file for complete search history.

(56) References Cited

U.S. PATENT DOCUMENTS

| | | | | |
|---|---|---|---|---|
| 3,790,780 A | * | 2/1974 | Helmcke | G08G 1/162 246/30 |
| 2003/0010872 A1 | | 1/2003 | Lewin et al. | |

(Continued)

FOREIGN PATENT DOCUMENTS

| | | |
|---|---|---|
| CN | 202863478 U | 4/2013 |
| DE | 3117655 C2 | 4/1985 |

(Continued)

OTHER PUBLICATIONS

International Search Report issued in corresponding International Application No. PCT/EP2019/025346, dated Jan. 9, 2020, pp. 1-2, English Translation.

*Primary Examiner* — Zachary L Kuhfuss
(74) *Attorney, Agent, or Firm* — Carter, DeLuca & Farrell LLP (57) ABSTRACT

In a system and method for operating a system having a rail, a stationary unit, rail-guided mobile parts, and a slotted hollow waveguide, either a first one of the mobile parts or the stationary unit functions as a transmitter, and a second one of the mobile parts functions as a receiver. The transmitter is configured for the simultaneous transmission of an electromagnetic signal and an acoustic signal, e.g., at a first instant. The receiver, which is set apart from the transmitter, is configured to detect the arrival of the electromagnetic
(Continued)

signal at a second instant and to detect the arrival of the acoustic signal at a third instant. The second mobile part has an evaluation unit which is configured to determine the distance between the transmitter and the receiver based on the acquired second and third instants.

21 Claims, 5 Drawing Sheets

(51) Int. Cl.
      *B61L 25/02*            (2006.01)
      *G01S 11/16*            (2006.01)
(52) U.S. Cl.
      CPC ........... *B61L 25/021* (2013.01); *B61L 25/026* (2013.01); *G01S 11/16* (2013.01); *B61L 25/025* (2013.01)

(56) References Cited

U.S. PATENT DOCUMENTS

| | | | | |
|---|---|---|---|---|
| 2011/0196580 A1* | 8/2011 | Xu | ........................ | B60W 50/14 |
| | | | | 340/905 |
| 2017/0006422 A1* | 1/2017 | Kim | ........................ | G01S 11/16 |

FOREIGN PATENT DOCUMENTS

| | | |
|---|---|---|
| DE | 102012006413 A1 | 10/2012 |
| DE | 102017009076 A1 | 4/2018 |

* cited by examiner

SYSTEM AND METHOD FOR OPERATING A SYSTEM HAVING A RAIL, A STATIONARY UNIT, RAIL-GUIDED MOBILE PARTS, AND A SLOTTED HOLLOW WAVEGUIDE

FIELD OF THE INVENTION

The present invention relates to a system and to a method for operating a system having a rail, a stationary unit, rail-guided mobile parts, and a slotted hollow waveguide.

BACKGROUND INFORMATION

In certain conventional systems, mobile parts are able to be moved in a rail-guided manner.

German Patent Document No. 31 17 655 describes a device for distance securing of rail-bound vehicles.

German Patent Document No. 10 2012 006 413 describes a transport system.

German Patent Document No. 10 2017 009 076 describes a rail system, which has a vehicle and a rail part.

SUMMARY

Example embodiments of the present invention provide a system in which the safety can be increased.

According to example embodiments of the present invention, a system includes a rail, a stationary unit, rail-guided mobile parts, and a slotted hollow waveguide, in which either a first one of the mobile parts or the stationary unit serves as a transmitter, and a second one of the mobile parts serves as a receiver. The transmitter is configured for the simultaneous transmission of an electromagnetic signal SE and an acoustic signal SA, e.g., at instant t0. The receiver, which is set apart from the transmitter, is configured to detect the arrival of electromagnetic signal SE at instant t1 and to detect the arrival of acoustic signal SA at instant t2. The second mobile part has an evaluation unit, which is configured to determine the distance between the transmitter and the receiver based on acquired instants t1 and t2.

This offers the advantage that the distance is able to be determined in an uncomplicated and economical manner and collisions—such as between two mobile parts—are therefore avoidable. Since electromagnetic waves are coupled into the hollow space of the slotted hollow conductor for the data transmission and decoupled on the receiver side, only a coupling unit for sound waves, e.g., acoustic waves, is additionally required on the transmitter and the receiver side for determining the distance. The coupling unit is, for example, implementable as an ultrasonic transducer. The sound and also the electromagnetic wave are thus able to propagate within the cavity, and the amplitude in each case decreases much less than in a propagation in free space.

Because of the simultaneous, that is to say, mutually synchronized, emitting of the electromagnetic waves and the sound waves, it is possible to determine the distance, i.e., by determining the time difference between the arrival of the signals on the receiver side and a corresponding evaluation of this time difference.

According to example embodiments, the evaluation unit is configured to determine the distance between the transmitter and the receiver according to the relationship $S=(t2-t1)/(1/v-1/c)$, $v$ representing the speed of sound and $c$ representing the speed of light. This has the advantage of allowing for a very precise distance determination.

According to example embodiments, the evaluation unit is configured to determine the distance between the transmitter and the receiver according to the relationship $S=(t2-t1)*v$, $v$ representing the speed of sound. This has the advantage that the distance is able to be determined in a simple and rapid manner, e.g., in a very good approximation, because the speed of light is much greater than the speed of sound.

According to example embodiments, the cavity of the slotted hollow waveguide covers a larger region in a first transverse direction to the rail direction than the slot of the slotted hollow waveguide, the first transverse direction, e.g., being aligned perpendicular to a second transverse direction that extends centrally through the slot. This offers the advantage that—viewed in the first transverse direction—the cavity is expanded on the side and stationary components that do not block the mobile part from driving along the rail can thus be accommodated there. For example, an antenna and a coupling unit for sound are able to be accommodated as components, which are connected to electronic subassemblies of the stationary unit.

According to example embodiments, an antenna of the stationary unit is set apart from the slot in the first transverse direction, e.g., is situated in a first relief cut, e.g., a rear engagement area, of the cavity, and/or a coupling device of the stationary unit suitable for sound waves is set apart from the slot counter to the first transverse direction, e.g., is situated in a second relief cut, e.g., a rear engagement area, of the cavity, the second relief cut, for example, being set apart from the first relief cut. This offers the advantage that no collision occurs with the mobile part or its antenna or coupling device during the rail-guided travel of the mobile part.

According to example embodiments, the mobile part, or each mobile part, has an antenna and a coupling device which is suitable for sound waves. Both the region covered by the antenna in the first transverse direction and the region covered by the coupling device in the first transverse direction are encompassed by the region covered by the slot in the first transverse direction. The antenna, for example, projects into the cavity of the slotted hollow waveguide or is situated inside the cavity, and the coupling device, for example, projects into the cavity of the slotted hollow waveguide or is situated inside the cavity. This has the advantage that the mobile part carries out the data transmission and the distance determination at the same time.

According to example embodiments, the slotted hollow waveguide is arranged as an aluminum continuous casting profiled part. This is considered advantageous insofar as it allows for an uncomplicated production.

According to example embodiments, the slotted hollow waveguide has a web or collar region as a boundary of the slot, which projects from both sides of the slot in the direction of the mobile part, through which especially the antenna and the coupling device of the mobile part project or through which a holding device for the antenna and the coupling device projects, which is formed of one piece or multiple pieces. This offers the advantage that an escape of hollow waves, i.e., the electromagnetic waves propagating in the cavity of the slotted hollow conductor, is reduced because the webs rising along both sides of the slot function as a great resistance to the propagation of the waves. The frequency of the electromagnetic waves particularly is selected to be of a magnitude such that a vibrational mode of the cavity is able to be excited but not a vibrational mode of the slot. To this end, the slot width is selected such that it does not correspond to a whole number multiple or a whole number percentage of the width or height of the cavity.

According to example embodiments, the antenna is electrically connected to a transceiver, which is connected to a modem. The coupling device is connected to a transceiver, which is connected to the modem that is connected to the evaluation unit. This has the advantage that a bidirectional data transmission is possible, e.g., identification information is able to be transmitted electromagnetically and/or with the aid of sound. The determined distances to the respective mobile part are therefore determinable in an unambiguous manner. This particularly means that the detected sound signal in each case is able to be uniquely allocated to the respective electromagnetic signal.

According to an example embodiment of the present invention, in a method for operating a system having a rail, a stationary unit, rail-guided mobile parts, and a slotted hollow waveguide, either a first one of the mobile parts or the stationary unit functions as a transmitter, and a second one of the mobile parts functions as a receiver. At instant to, the transmitter starts sending an electromagnetic signal and an acoustic signal at the same time, the receiver determines instant t1 of the arrival of electromagnetic signal SE and instant t2 of the acoustic signal SA, and the distance between the transmitter and the receiver is determined, e.g., with the aid of an evaluation unit of the second mobile part. This has the advantage that an uncomplicated distance determination is possible and a collision of two mobile parts is therefore preventable in that braking or stopping of the mobile parts is induced, e.g., by evaluation unit 28, when a threshold value is undershot, that is to say, with too short a distance. The safety is therefore increased. As an alternative, it is possible to move the mobile parts at predefined intervals. For this purpose, evaluation unit 28 of the mobile part is provided with a controller, which sets the speed of the vehicle such that the respectively determined distance is controlled to the predefined setpoint value for the distance. The setpoint value may also be selected as a function of the speed. That is to say, when the moving average of the speed of the mobile part increases, then the setpoint value increases as well, e.g., in particular proportionally to the square of the average. As a result, sufficient braking distance is still available in a safety case.

Thus, it is possible that the setpoint value is predefined proportionally to the square of the moving average of the detected speed. Instead of the moving average, a low-pass-filtered value of the detected speed may be used as well.

Further features and aspects of example embodiments of the present invention are described in greater detail with reference to the appended schematic Figures.

DETAILED DESCRIPTION

As schematically illustrated in the Figures, the system according to an example embodiment of the present invention has a slotted hollow conductor 21 which functions as a transmission channel 12.

Mobile parts 10 are arranged as a rail vehicle, e.g., for a monorail suspension rail. Slotted hollow conductor 21 is installed in parallel with a rail in the system, e.g., in one piece with the rail.

Slotted hollow conductor 21 is arranged as an aluminum continuous casting profiled part. The slotted hollow conductor has a cavity whose width transversely to the rail direction, e.g., transversely to the slot direction, i.e., transversely to the drawing direction of the continuous casting profile, is greater than the slot width of the slot of the slotted hollow waveguide 21.

Because of the broader configuration of the cavity transversely to the rail direction, a relief cut is produced in which an antenna 22 of stationary unit 11 may be positioned on the first side, and a coupling device 24 for sound waves, e.g., an ultrasonic transmitter, may be placed on the other side.

That is to say, the region covered by the slot in this transverse direction is situated between the region covered by antenna 22 and the region covered by coupling device 24.

Antenna 22 is connected to a transceiver 23 so that data are able to be transmitted or received. Transceiver 23 is connected to a modem 27 for a data transmission and the identification of received data telegrams, the modem being connected to an evaluation unit 28.

Electromagnetic waves are therefore able to be received with the aid of antenna 22 and the received signals are able to be evaluated.

In the same manner, coupling device 24 for sound waves is connected to a transceiver 25, which is connected to modem 27 via a filter and signal-amplification unit 26.

As a result, coupling unit 29 of stationary unit 11 is operable such that a sound signal and an electromagnetic signal are able to be emitted simultaneously, e.g., by antenna 22 or by coupling unit 24.

Figure 1:
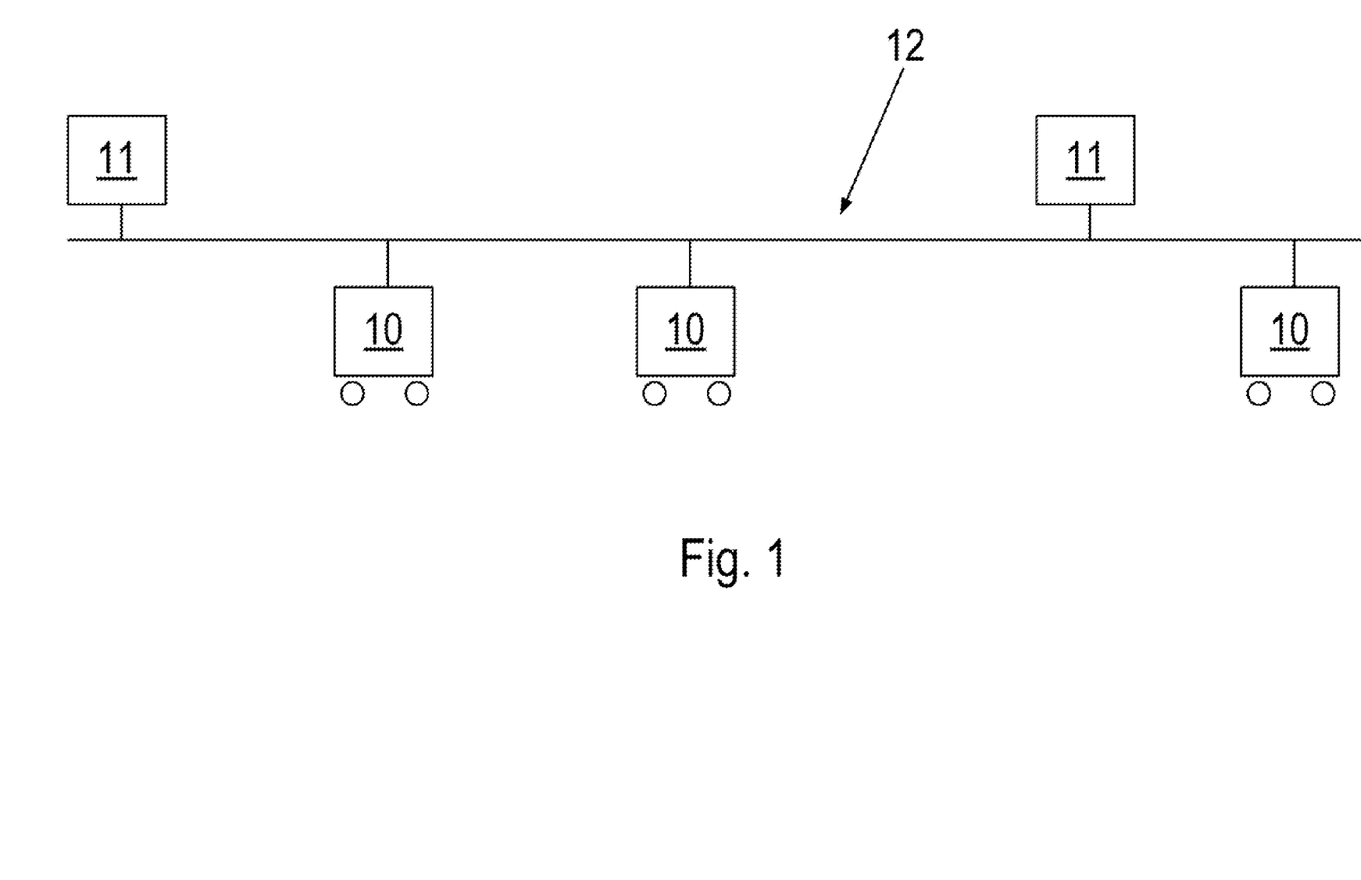
In FIG. 1, the data transmission between a stationary unit 11 and mobile parts 10 functioning as rail vehicles is schematically illustrated.
Figure 2:
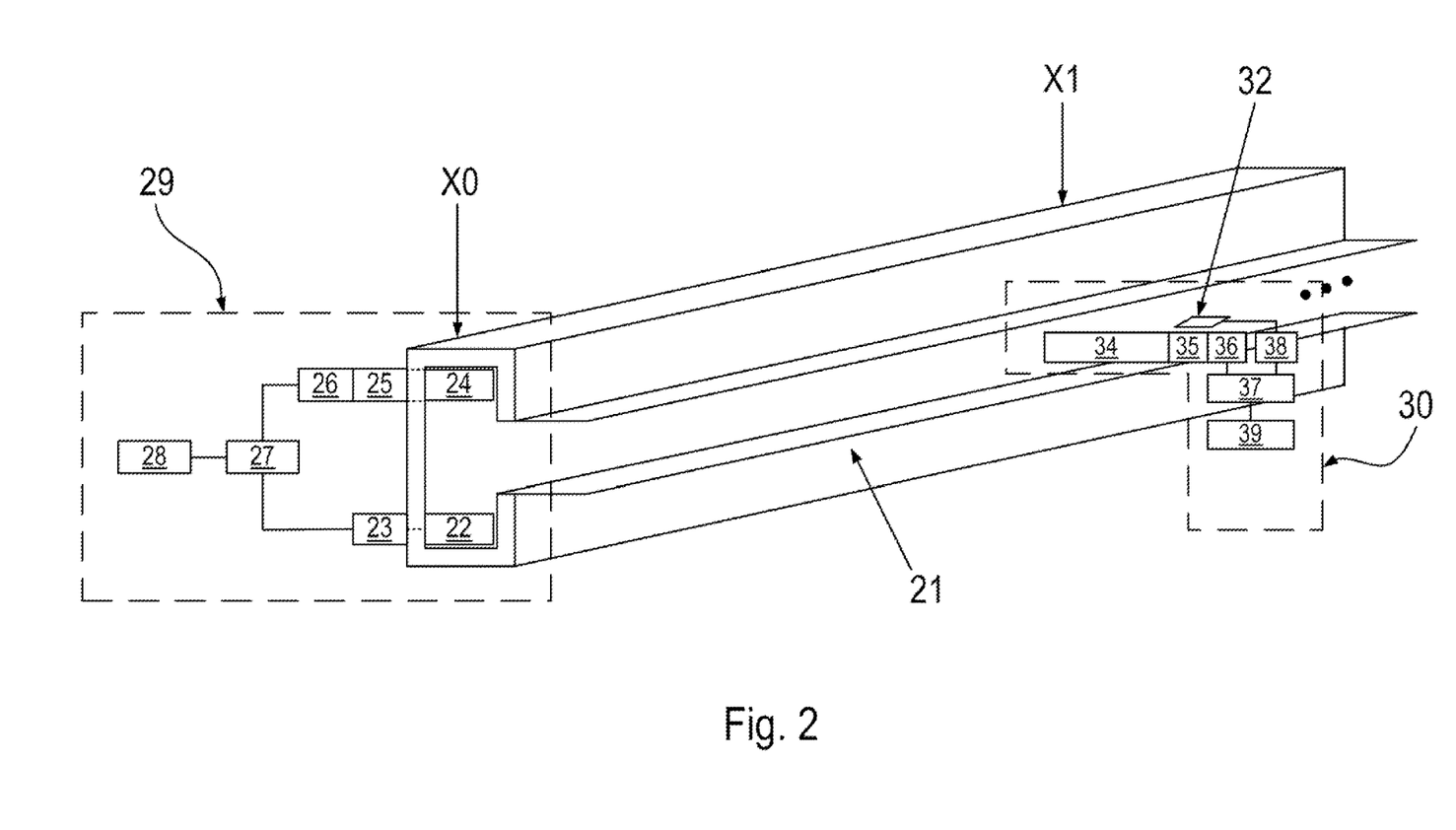
In FIG. 2, a coupling unit 29 of stationary unit 11 is schematically illustrated, coupling unit 30 of a first one of mobile parts 10 and slotted hollow conductor 21, which functions as transmission channel 12, being schematically illustrated in an oblique view.

As illustrated in FIG. 2, mobile part 10 has a coupling unit 30 whose antenna 32 is configured to receive the wave transmitted by stationary unit 11, e.g., its antenna 22, and propagating inside the cavity of slotted hollow waveguide 21. The signals received by antenna 32 are conveyed to a transceiver 38, which is connected via a modem 37 to an evaluation unit 39 of mobile part 10.

As also antenna 32, a coupling device 34 for sound waves is connected to a transceiver 35, which is connected to modem 37 via a filter and signal-amplification unit 36 for a data transmission and identification of received data telegrams to evaluation unit 39.

As a result, mobile part 10 is able to receive the signals emitted by stationary unit 11, the sound wave being detected at a later instant than the electromagnetic wave.

Based on the time difference acquired in this manner, the distance between stationary unit 11 and mobile part 10 is determined in evaluation unit 39.

Figure 4:
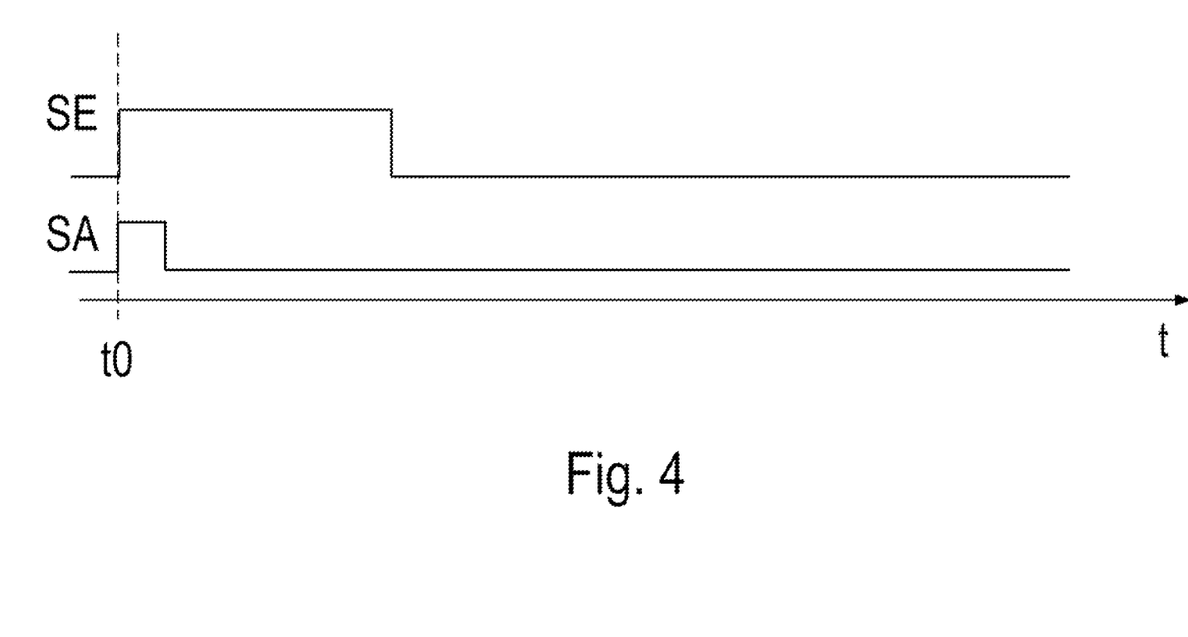
In FIG. 4, the signal characteristics of a unit 11 functioning as a transmitter or of a mobile part 10 functioning as a transmitter are schematically illustrated.

As illustrated in FIG. 4, the stationary unit simultaneously emits electromagnetic signal SE and acoustic signal SA, i.e., sound signal, at instant t0, the electromagnetic signal SE being modulated and thus also used for the data transmission.

Figure 5:
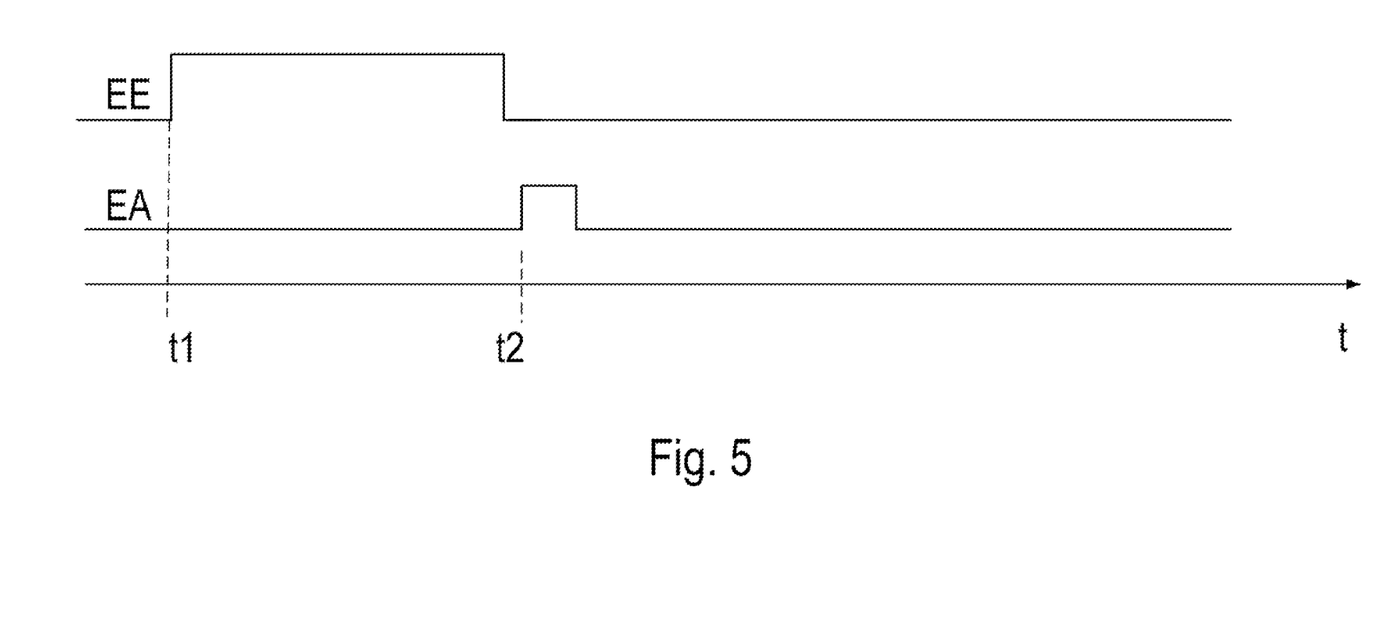
In FIG. 5, the signal characteristics of a unit 11 functioning as a receiver or of a mobile part 10 functioning as a transmitter are schematically illustrated.

As illustrated in FIG. 5, mobile part 10 detects electromagnetic signal SE at instant t1 and subsequently the transmitted data. Acoustic signal SA is detected only at later instant t2.

Distance S between stationary unit 11 and mobile part 10 is determined from the difference between these two times, according to the relationship S=(t2−t1)/(1/v−1/c), v being the speed of sound and c being the speed of light.

In further exemplary embodiments, distance S is determined in a close approximation according to the relationship S=(t2−t1)*v.

Figure 3:
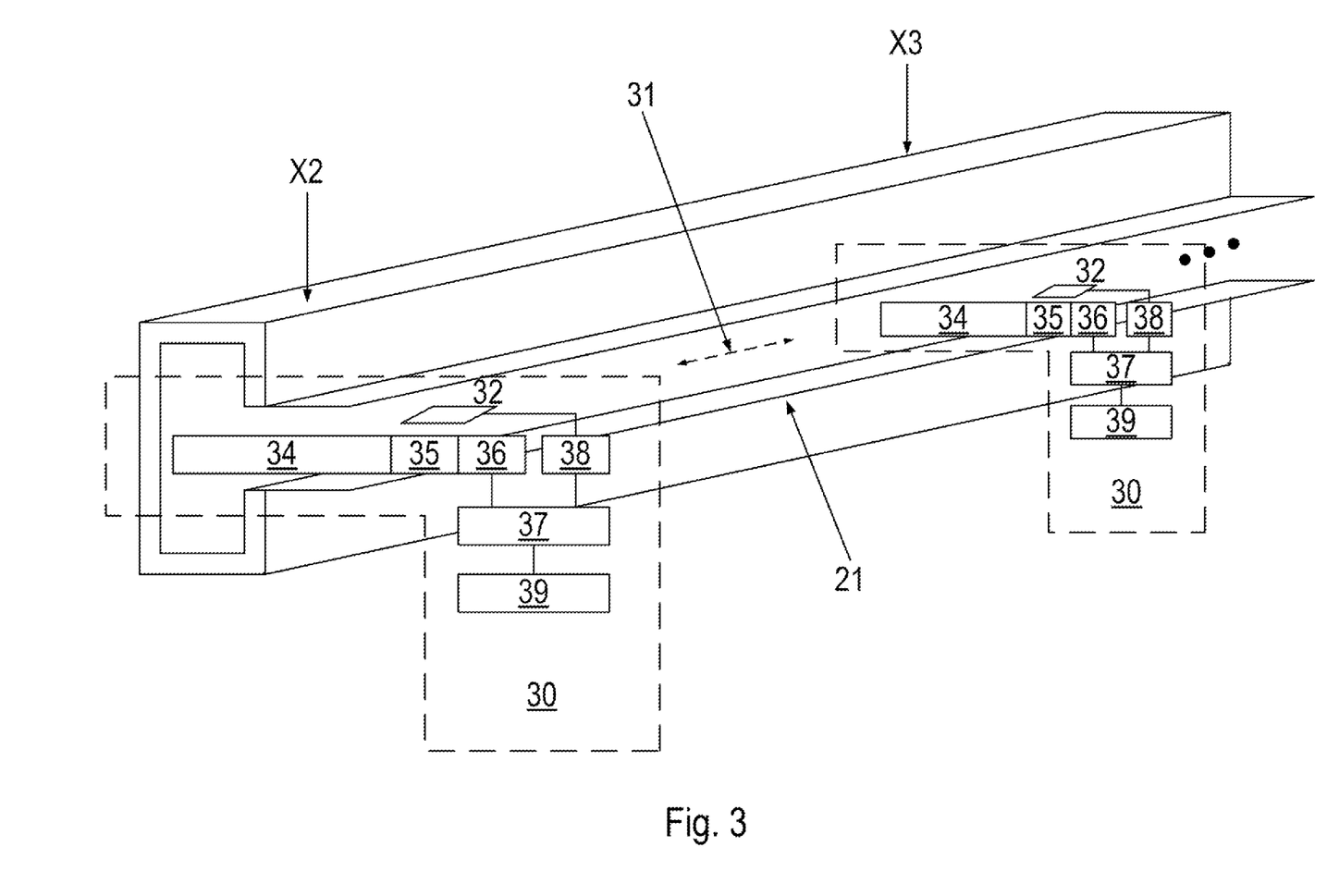
In FIG. 3, in contrast to FIG. 2, instead of stationary unit 11, hollow wave-coupling unit 30 of a second one of mobile parts 10 is schematically illustrated.

As illustrated in FIG. 3, the distance between two mobile parts can also be determined. To do so, a first one of mobile parts 10 simultaneously emits electromagnetic signal SE and sound signal SA at instant t0 and the evaluation unit of second mobile part 10 determines the distance between the transmitter and the receiver based on acquired instants t1 and t2. At instant t1, the receiver detects the arrival of electromagnetic signal SE, and at instant t2, the receiver detects the arrival of acoustic signal SA.

LIST OF REFERENCE CHARACTERS 10 mobile part
11 stationary unit
12 transmission channel
21 slotted hollow conductor
22 antenna
23 transceiver for electromagnetic waves
24 coupling device for sound waves
25 acoustic transceiver
26 filter and signal-amplification unit
27 modem for a data transmission and identification of received data telegrams
28 evaluation unit
29 coupling unit
30 coupling unit
31 propagation directions for sound waves and electromagnetic waves
32 antenna
34 coupling device for sound waves
35 transceiver
36 filter and signal-amplification unit
37 modem for a data transmission and identification of received data telegrams
38 transceiver
39 evaluation unit
X0 reference position of stationary unit 11
X1 first position, e.g., a first mobile part
X2 second position, e.g., of a second mobile part

The invention claimed is:

1. A system, comprising:
a rail;
a stationary unit;
rail-guided mobile parts; and
a slotted hollow waveguide;
wherein the stationary unit or a first one of the mobile parts is arranged as a transmitter adapted to simultaneously transmit an electromagnetic signal and an acoustic signal at a first instant;
wherein a second one of the mobile parts is arranged as a receiver set apart from the transmitter by a distance and adapted to detect arrival of the electromagnetic signal at a second instant and to detect arrival of the acoustic signal at a third instant;
wherein the second mobile part includes an evaluation unit adapted to determine the distance between the transmitter and the receiver based on the second instant and the third instant;
wherein a cavity of the slotted hollow waveguide covers a larger region in a first transverse direction to a rail direction than a slot of the slotted hollow waveguide; and
wherein an antenna of the stationary unit is set apart from the slot in the first transverse direction and/or a coupling device of the stationary unit adapted for sound waves is set apart from the slot counter to the first transverse direction.

2. The system according to claim 1, wherein the evaluation unit is adapted to determine the distance between the transmitter and the receiver based on the relationship:

$$S=(t2-t1)/(1/v-1/c),$$

S representing the distance between the transmitter and the receiver, t1 representing the second instant, t2 representing the third instant, v representing the speed of sound, and c representing the speed of light.

3. The system according to claim 1, wherein the evaluation unit is adapted to determine the distance between the transmitter and the receiver based on the relationship:

$$S=(t2-t1)*v,$$

S representing the distance between the transmitter and the receiver, t1 representing the second instant, t2 representing the third instant, and v representing the speed of sound.

4. The system according to claim 1, wherein the first transverse direction is aligned perpendicular to a second transverse direction that extends centrally through the slot.

5. The system according to claim 1, wherein the antenna is arranged in a first relief cut of the cavity.

6. The system according to claim 5, wherein the coupling device is arranged in a second relief cut of the cavity.

7. The system according to claim 6, wherein the second relief cut is set apart from the first relief cut.

8. The system according to claim 1, wherein at least one of the mobile parts includes a mobile-part antenna and a mobile-part coupling device adapted for sound waves, both a region covered by the mobile-part antenna in the first transverse direction and a region covered by the mobile-part coupling device in the first transverse direction are encompassed by a region covered by the slot in the first transverse direction.

9. The system according to claim 8, wherein the mobile-part antenna projects into or is arranged inside the cavity of the slotted hollow waveguide and/or the mobile-part coupling device projects into or is arranged inside the cavity of the slotted hollow waveguide.

10. The system according to claim 1, wherein each mobile part includes a mobile-part antenna and a mobile-part coupling device adapted for sound waves, both a region covered by the mobile-part antenna in the first transverse direction and a region covered by the mobile-part coupling device in the first transverse direction are encompassed by a region covered by the slot in the first transverse direction.

11. The system according to claim 1, wherein the slotted hollow waveguide is arranged as an aluminum continuously cast profiled part.

12. The system according to claim 1, wherein the slotted hollow waveguide includes a web or collar region as a boundary of a slot of the slotted hollow waveguide, the web or collar region projecting from both sides of the slot in a direction of the mobile part.

13. The system according to claim 12, wherein an antenna and a coupling device of the mobile part project through the web or the collar region and/or a holding device that holds the antenna and the coupling device of the mobile part projects through the web or the collar region.

14. The system according to claim 13, wherein the holding device is formed of a single piece or multiple pieces.

15. The system according to claim 1, wherein the antenna and the coupling are electrically connected to a transceiver, which is connected to a modem, and the modem is connected to the evaluation unit.

16. A system, comprising:
a stationary unit;
rail-guided mobile parts; and
a slotted hollow waveguide;
wherein the stationary unit or a first one of the mobile parts is arranged as a transmitter adapted to simultaneously transmit an electromagnetic signal and an acoustic signal at a first instant;
wherein a second one of the mobile parts is arranged as a receiver set apart from the transmitter by a distance and adapted to detect arrival of the electromagnetic signal at a second instant and to detect arrival of the acoustic signal at a third instant;
wherein the second mobile part includes an evaluation unit adapted to determine the distance between the transmitter and the receiver based on the second instant and the third instant;
wherein a cavity of the slotted hollow waveguide covers a larger region in a first transverse direction to a rail direction than a slot of the slotted hollow waveguide; and
wherein an antenna of the stationary unit is set apart from the slot in the first transverse direction and/or a coupling device of the stationary unit adapted for sound waves is set apart from the slot counter to the first transverse direction.

17. A method for operating a system that includes a rail, a stationary unit, rail-guided mobile parts, and a slotted hollow waveguide, the stationary unit or a first one of the mobile parts arranged as a transmitter, a second one of the mobile parts arranged as a receiver, comprising:
starting simultaneous transmission, at a first instant, by the transmitter, an electromagnetic signal and an acoustic signal;
determining, by the receiver, an instant of arrival of the electromagnetic signal and an instant of arrival of the acoustic signal; and
determining a distance between the transmitter and the receiver based on the instant of arrival of the electromagnetic signal and the instant of arrival of the acoustic signal;
wherein a cavity of the slotted hollow waveguide covers a larger region in a first transverse direction to a rail direction than a slot of the slotted hollow waveguide; and
wherein an antenna of the stationary unit is set apart from the slot in the first transverse direction and/or a coupling device of the stationary unit adapted for sound waves is set apart from the slot counter to the first transverse direction.

18. The method according to claim 17, wherein the distance is determined by an evaluation unit of the second mobile part.

19. The method according to claim 17, further comprising controlling the determined distance to a predefined setpoint value for the distance.

20. The method according to claim 19, wherein the controlling of the determined distance to the predefined setpoint value for the distance by includes setting a speed of the mobile part.

21. The method according to claim 19, wherein the setpoint value is predefined proportionally to a square of a moving average of detected speed of the mobile part and/or proportionally to a low-pass-filtered value of the detected speed.

* * * * *